United States Patent Office 3,702,227
Patented Nov. 7, 1972

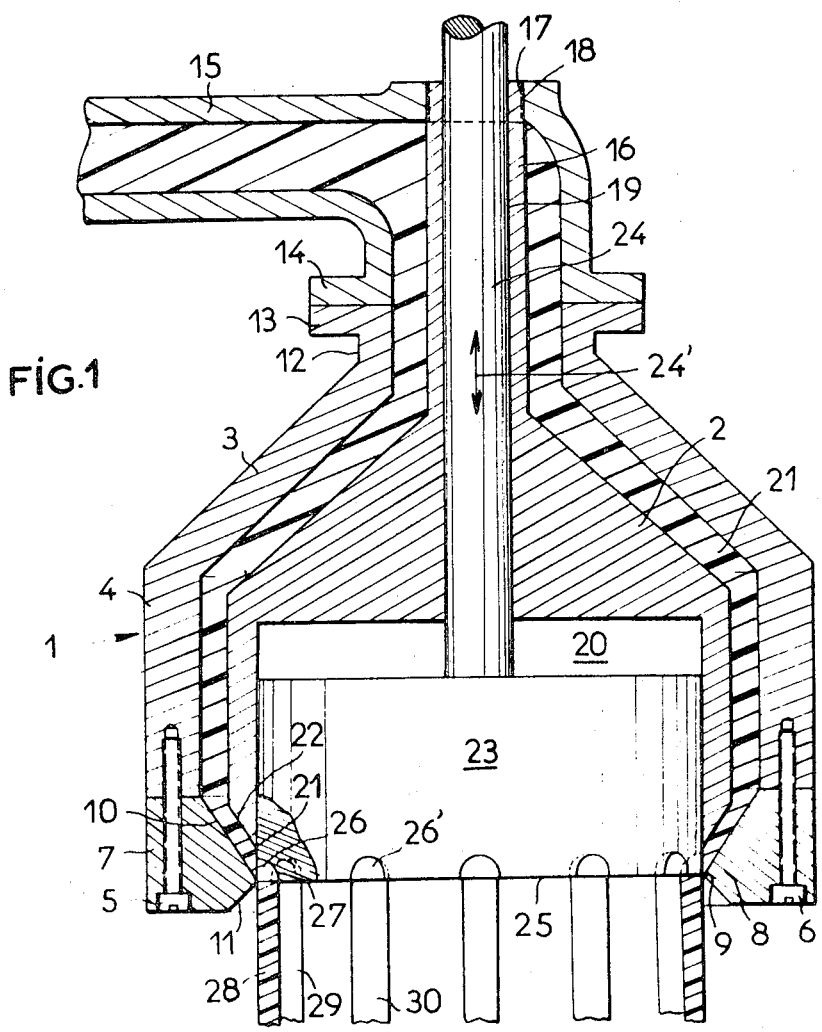

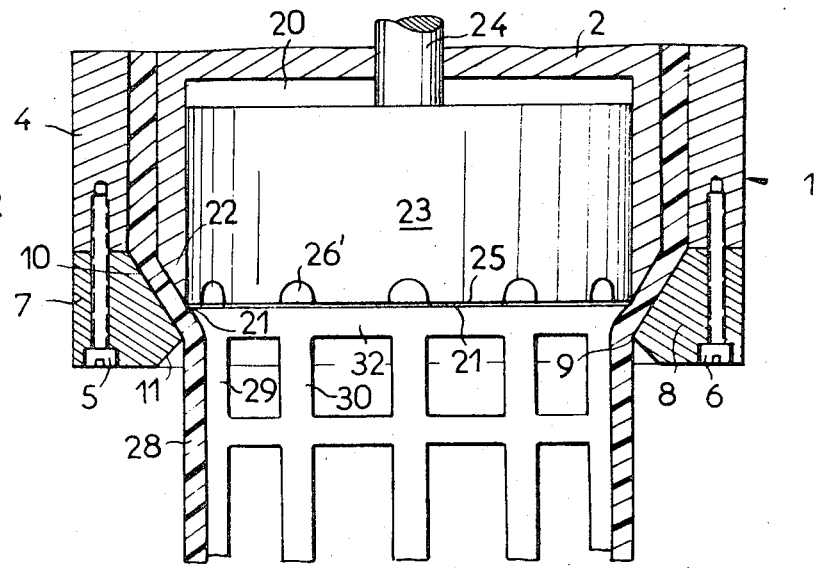
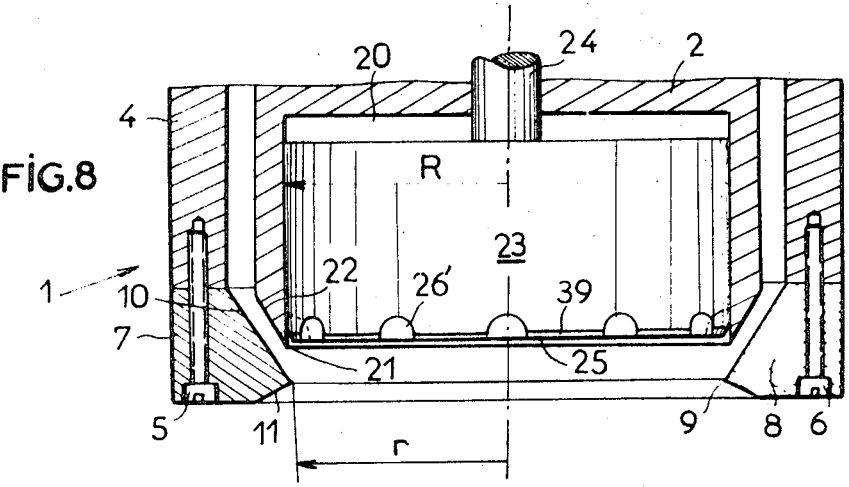

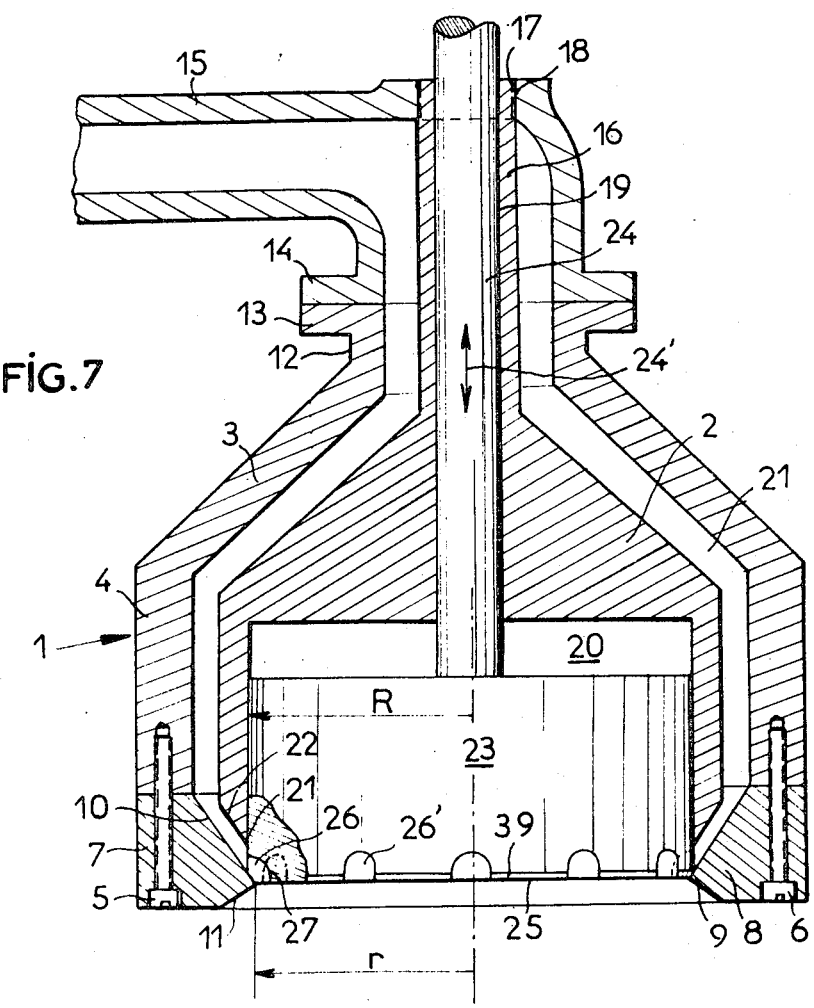

3,702,227
EXTRUSION DIE FOR THE MANUFACTURE OF NETS OF ARTIFICIAL MATERIAL
Jacques Hureau, 18 Rue de la Glaciere, Paris 13, France
Division of application Ser. No. 872,196, Oct. 29, 1969, now abandoned. This application Apr. 29, 1971, Ser. No. 138,411
Claims priority, application France, Dec. 3, 1968, 176,368; Canada, Dec. 3, 1969, 068,920; Great Britain, Feb. 21, 1971, 9,507/71
Int. Cl. B29d 23/04; B29f 3/04
U.S. Cl. 425—466
8 Claims

ABSTRACT OF THE DISCLOSURE

An extrusion apparatus for producing tubular articles of a solidifiable extrudable material having a tubular structure. The apparatus has a tubular member open at one end. A core member is disposed axially within the tubular member and jointly therewith defines an annular space terminating in an annular extrusion orifice opening into the interior of the tubular member adjacent the open end thereof. The core member has a surface disposed axially spaced from the open end of the tubular member defining an innermost axially disposed boundary of said extrusion orifice relative to the open end of the tubular member. The core member has a bore defining a chamber on an end thereof adjacent the open end. A piston is mounted for reciprocation in the chamber selectively and alternately actuated in operation to a first position obstructing the annular extrusion orifice and a second position unobstructing the extrusion orifice. The piston lower circumferential edge portion has extrusion notches circumferentially spaced thereon open to side surfaces of the piston and an end face confronting the open end of the tubular element. Separate, circumferentially spaced strands are extruded through these notches in a machine direction when the extrusion orifice is obstructed by the piston and an annular ring integral with the strands and as a continuation thereof when the extrusion orifice is unobstructed.

---

This is a divisional application of my co-pending application Ser. No. 872,196 of Oct. 29, 1969, which is now abandoned, for: Manufacture of nets of artificial material.

The invention relates in a general manner to the manufacture of nets of artificial material, especially synthetic plastics—preferably thermoplastic—material, and it relates more particularly to a net extrusion device suitable for a conventional extruder and adapted to produce tubular nets with square or rectangular meshes with no welding at the intersections, two sides or arms of the meshes being parallel to the axis of the tube extruded and the other sides of the meshes being perpendicular to this axis.

The invention also relates to a process for manufacturing nets of this kind.

Tubular nets of this type have the advantage of much greater stability of shape than nets extruded with lozenge-shaped meshes. As a result they are much more suitable than the latter for a large number of applications, for example in the packaging field.

Among the various net extrusion devices proposed for continuous extrusion of square-mesh tubular nets, some have two net extrusion elements movable relative to one another by means of a rectilinear, alternating movement. In one of the known devices, one element is a support having, on the periphery of an internal lip, a conical surface with radial notches, and the other element is a disc having, on the surface facing the notches, a projecting web which comes to bear periodically on that zone of the support containing the notches.

This device operates very satisfactorily, but it must be adjusted very precisely in order to prevent stress when the support and disc come together, and thus to minimize wear on the rib and possibly on the notched zone of the support. However, since the artificial material always moves in the same direction and does not meet any mechanical stress of opposite sense or direction, the molecular chains run parallel to the axis of the tube extruded and the net has greater mechanical strength.

Other proposed devices for forming square-mesh tubular nets and also nets with lozenge-shaped meshes with transverse sides perpendicular to the axis of the tube extruded are also of the type having two extruder elements movable relative to one another and conical in general configuration. In these devices, however, the motion of one extruder element either crushes the plastics periodically in certain zones in a direction precisely opposite to that of extrusion, or forms a premoulding groove at right-angles to the tube axis. In either case, the molecular chains in the extruded plastics are periodically subjected to different orientations in certain zones, so that in the material constituting the tubular nets, the molecular chains do not all run in the same direction.

By means of the device in accordance with the invention, these disadvantages can be overcome.

This device is essentially characterised in that one of these elements has a substantially annular chamber serving to supply the plasticised plastics material through an annular slot into a hollow chamber, and the other element, which is generally shaped like a piston, cuff or bell, is movable in this chamber and has a series of peripheral notches adapted to come periodically opposite the annular slot.

When the series of peripheral notches is at the level of the slot, longitudinal sides parallel to the piston axis are extruded. When the piston is raised far enough for its end face to reveal all the slot, a transverse side, attached to each of the longitudinal sides just formed, is extruded through the slot. These operations are repeated by making the piston carry out a rectilinear reciprocating movement, yielding a tubular net with square or rectangular meshes, depending on the ratio between the piston stroke and the uniform interval separating the notches from one another.

In the piston position in which the series of notches is at slot level, the material is pushed through the notches in a direction substantially the same as that of extrusion through the slot when the slot is revealed, so that the molecular chains have the same orientation in both the vertical and the transverse sides of the meshes.

In order to ensure that the passage of the synthetic plastics material through the notches gives the molecular chains the desired orientation, each notch has a back forming a guide surface for the synthetic plastics material.

By giving the notches different shapes, vertical mesh sides with corresponding cross-sections can be obtained, giving tubular nets of different appearance. For example, if each notch has in the lateral face of the piston a circular or approximately circular opening and a curved back extending in the direction of extrusion, the inner faces of all the longitudinal mesh sides will be curved. Alternatively, however, the notches may be triangular or crenellated, in which case the longitudinal mesh sides will have a triangular or rectangular cross-section.

To ensure that no transverse mesh sides will be formed during extrusion of the longitudinal mesh sides, sealing means may be provided in one or both of the extruder elements to prevent material from passing across the peripheral piston zones between successive notches while the piston is in the position in which the notches are at the level of the annular slot.

In a preferred embodiment of the invention, the slot is formed by two conical surfaces of which one is in the end face of a cylindro-conical core, having a chamber in which the piston moves and mounted with some radial clearance inside a cylindro-conical external casing, and the other is in the end portion of this casing, the distance of the lip of the conical surface on the end portion of the cylindro-conical casing from the piston axis being slightly less than the distance between the lip on the end face of the core and the piston axis. As a result, the piston, the end face of which may be chamfered, comes to bear—when in the position in which the longitudinal mesh sides are extruded—on the circular lip on the end portion of the external casing, preventing any synthetic plastics material from passing over the peripheral zones between successive notches.

Advantageously, the cylindro-conical casing has in its end face a detachable and interchangeable ring, of which the inner peripheral portion has a conical surface parallel to that on the end face of the core and co-operating with the latter to form the slot, the radius of the lip of the conical ring face being less than the radius of the piston.

Preferably, the ring is attached to the casing by means of screws or pins, and the height of the slot can be modified by placing adjusting washers between the ring and the end face of the cylindro-conical casing.

Lastly, the invention also relates to a process for making weldless tubular net of synthetic plastics material, having square or rectangular meshes with two sides parallel to the tube axis, a process which may be characterised in that it consists in extruding longitudinal mesh sides by means of a notched obturator forming an interrupted obstruction over a circular extrusion slot and extruding transverse sides by moving the obturator completely off the slot.

In order that the invention may be well understood there will now be described some embodiments thereof, given by way of example only, reference being had to the accompanying drawings in which:

FIG. 1 represents a diagrammatic axial section through one embodiment of a net extrusion device, the piston being in the position in which the series of notches are opposite the slot;

FIG. 2 is a partial view, in section similar to FIG. 1, in which the piston is in the position in which it reveals the slot;

Figure 3:
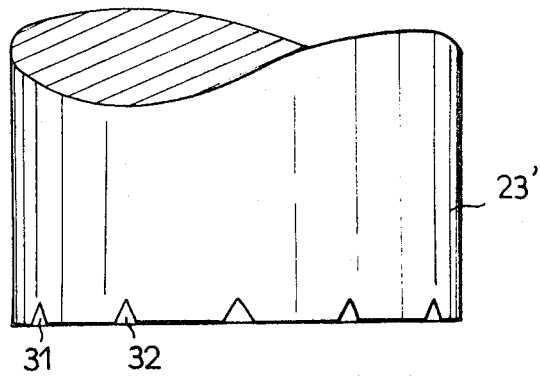
FIGS. 3 and 4 illustrate diagrammatically embodiments of the piston with triangular and crenellated notches respectively.
Figure 5:
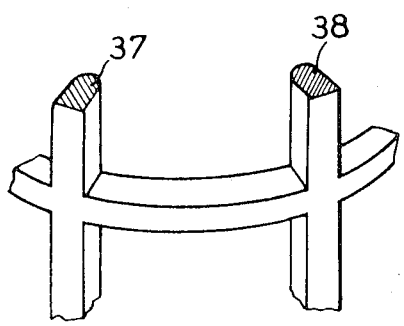
Figure 6:
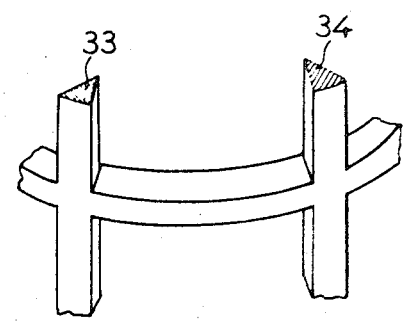

FIGS. 5 and 6 illustrate diagrammatically and partially the shapes of vertical mesh sides obtained using the pistons shown in FIGS. 1 to 3 respectively, and portions of transverse mesh sides connecting the vertical sides; and FIGS. 7 and 8 are views similar to those in FIGS. 1 and 2, illustrating a variant of the device embodying the invention.

The net extrusion device shown in FIG. 1 has two extrusion elements. The first of these extrusion elements has an external housing, generally designated 1, and an internal core 2.

The external housing is formed as a conical casing 3 ending in a cylindrical portion 4 to which screws 5, 6 attach an end ring 7. The inner portion of the ring has an annular shoulder 8. This shoulder has a circular lip 9, a surface 10 sloping downwards towards the longitudinal axis of the conical casing 3, and a surface 11 sloping in the opposite direction from the surface 10.

At the narrow end of the conical casing, a cylindrical neck 12 ends in a flange 13, by means of which the extrusion element 1 is attached to a flange 14 on a duct 15 for supplying synthetic plastics material from a covential extruder (not shown).

The core 2 bears an extension 16, of which the threaded end 17 is screwed into a tapped hole 18 in the upper wall of the end of the duct 15. The core 2 and its rod 16, which may be two elements assembled together or a single element, contain a bore 19. Also, that portion of the core which is lower down in the drawing contains a chamber 20, and its outer surface is shaped to correspond to the inner surface of the external housing 1 and is situated at some distance from the latter, in order to form a chamber 21 communicating freely with the duct 15. The plasticised synthetic plastics material passes along this chamber 21 towards a slot formed by the slip 9 of the ring 7 and a terminal lip 21' of an oblique surface 22 of the core 2. This surface 22 is parallel to the oblique surface 10 of the ring.

The second extrusion device element comprises a piston 23 having a rod 24, movable axially in the bore 19. The piston is movable in the chamber or cylinder 20 inside the core 2. The rod 24 is controlled by conventional electrical, mechanical, hydraulic or pneumatic means which cause it and the piston 23 to reciprocate in a straight line as indicated by a double arrow 24', and which are preferably adjustable so that the piston stroke can be set as desired.

An end face 25 of the piston 23 contains a peripheral series of notches such as 26, 26'. Each of these notches is open both to the lateral cylindrical surface of the piston 23 and to the end face 25 of the piston, and each has a back 27 curving towards the end face 25.

The piston 23 in the position shown in FIG. 1, forms an obstruction over the slot interrupted by the notches 26, 26', etc., which are at the level of the slot and plasticised synthetic plastics material coming along the chamber 21 can proceed only through the notches, with the result that the longitudinal mesh sides 28, 29, 30, etc., are extruded. These longitudinal sides are equispaced around the axis of the rod 24 and therefore around the axis of the net extrusion device, if the notches 26, 26' are equispaced around the piston 23.

If the piston is lifted into the position shown in FIG. 2, in which its end face 25 is at or above the level of the lip 21' on the core 2, the slot formed by the lips 9, 21' is completely revealed, and the synthetic plastics material is exruded in the form of a ring or transverse mesh side 32 immediately connected to the longitudinal mesh sides 28, 29, 30, etc., previously extruded. If these operations are repeated, a tubular net with rectangular meshes is extruded.

Whereas the number of longitudinal mesh sides is always equal to the number of notches, the length of these mesh sides and the height of the transverse mesh sides depend on the frequency of the rectilinear alternating movement imposed on the piston 23.

As FIGS. 1 and 2 indicate, no percussive stress is produced between the piston and the lip 9, and there is therefore practically no wear on the piston or this lip.

These two figures also indicate that the synthetic plastics material always flows in substantially the same direction, so that the molecular chains have the same orientation in both the longitudinal mesh sides and the transverse mesh sides.

FIG. 3 illustrates diagrammatically and in part a piston 23' in which the notches, for example notches 31, 32, open on to the lateral and end faces of the piston through triangular openings. The shape of the longitudinal mesh sides 33, 34 is then as shown diagrammatically in FIG. 6.

Figure 4:
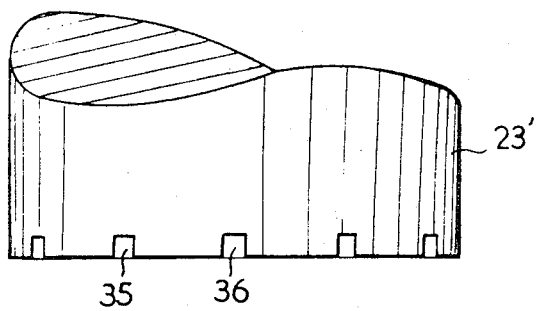

In FIG. 4, the openings leading from the notches 35, 36 into the lateral end faces of the piston are in the form of crenellations connected by curved backs as in FIG. 1, and the configuration of the longitudinal mesh sides 37, 38 is as shown in FIG. 5.

In the embodiments described with reference to FIGS. 1 to 4, it should be noted that appropriate sealing means (not described or shown) must be provided between the piston 23 and those surfaces of the core 2 and ring 7 with which it co-operates, in order to prevent plastics from passing over the peripheral piston zones between successive notches while the piston is in the position for producing longitudinal sides. If not, one may extrude a tube with solid walls bearing on their outer surfaces a reticulated network of square or lozenge-shaped meshes.

To this end, appropriate sealing means may be provided in the peripheral surface of the cylinder between the notches. Preferably, however, the solution is that in the embodiment shown in FIGS. 7 and 8, which are views similar to FIGS. 1 and 2, like elements being designated by like references.

The embodiment shown in FIGS. 7 and 8 differs from that shown in FIGS. 1 and 2 solely in a different configuration of the end face of the piston and of the lip 9 of the shoulder 8 on the ring 7, giving the desired seal by simple means. The end face 25 of the piston 23 has a chamfer 39, the conicity of which is equal or substantially equal to that of the face 22 on the core 2, and the lip 9 on the ring 7 projects beyond the lip 21, or, what amounts to the same thing, the radius r of the lip 9 is less than the radius R of the chamber 20.

As a result, and as is clear from FIG. 8, in which the plastics has been omitted to avoid overloading the drawing, when the piston is in its lower position the lip chamfer 39 bears in a fluid-tight manner on the corresponding portion of the shoulder 8. The plastics cannot flow except through the notches, and it is prevented from passing over the peripheral zones situated between successive notches. The production of a reticulated tubular net with clear openings or meshes is therefore ensured.

Obviously, if a solid-walled tube with a reticulated network of square or rectangular meshes on its outer surface is desired, it is only necessary to regulate the piston stroke so that the piston stops, in its lower position, at some distance from the conical surface 10 of the ring 7.

Clearly, the different shapes of notches which may be used are not restricted to those described, and other notches may be used without exceeding the scope of the invention, which also covers the novel industrial product obtained by means of the device described above by way of example.

I claim:

1. An extrusion apparatus for producing tubular articles of a solidifiable extrudable material having a net-like tubular structure comprising, a tubular member open at one end and having internally thereof an axial core member fixed axially relative thereto and spaced inwardly from the inner walls of the tubular member defining jointly therewith an annular extrusion space terminating in an annular extrusion into the interior of said tubular member adjacent the open end thereof, said core member having a surface thereof disposed axially spaced from the open end of the tubular member defining an innermost axially disposed boundary of said extrusion orifice relative to said open end, said core member having a bore defining a chamber on an end thereof adjacent said open end, a piston displaceable selectively reciprocally in said chamber to a first position obstructing said annular extrusion orifice and to a second position unobstructing said annular extrusion orifice, said piston having a circumferential edge portion having circumferentially spaced extrusion notches, means for selectively reciprocating said piston in operation to said first position with said extrusion notches in registry with said extrusion orifice in communication therewith providing communication between said extrusion orifice and the open end of said tubular member and alternately to said second position in which said extrusion is unobstructed, whereby solidifiable material is extrudable as separate circumferentially spaced strands extruded in a machine direction when said piston is in said first position and alternately as an annular ring of solidifiable material integral with said strands and as a continuation thereof when said piston is in said second position.

2. An extrusion apparatus according to claim 1, in which said piston comprises side surfaces and an end face surface confronting said open end of the tubular element, said extrusion notches opening to the side surfaces and said end face surface.

3. An extrusion apparatus according to claim 1, in which said extrusion notches are configured generally rectangular in cross section.

4. An extrusion apparatus according to claim 1, in which said extrusion notches are configured triangular in cross section to said strands.

5. An extrusion apparatus according to claim 1, in which said extrusion notches comprise arcuate openings to said side surfaces and said end face surface.

6. An extrusion apparatus according to claim 1, in which said tubular element comprises a removably mounted ring defining said orifice in conjunction with said core member.

7. An extrusion apparatus according to claim 4, in which said ring comprises an inwardly projecting edge adjacent the open end of said tubular member, said piston having side surfaces coacting with said edge to obstruct said extrusion orifice.

8. An extrusion apparatus according to claim 7, in which said ring comprises two converging surfaces defining said edge, and said piston having a peripheral chamfered surface seating on and coacting with one of said converging surfaces when said piston is in said first position.

References Cited

UNITED STATES PATENTS

| | | | |
|---|---|---|---|
| 3,384,692 | 5/1968 | Galt et al. | 18—12 N X |
| 3,186,032 | 6/1965 | Harwood | 18—14 V |
| 3,327,350 | 6/1967 | Limbach | 18—14 V |
| 3,218,672 | 11/1965 | Langecker | 18—14 V |
| 3,252,181 | 5/1966 | Hureau | 18—12 N |
| 3,349,434 | 10/1967 | Hureau | 18—14 V X |
| 3,579,733 | 5/1971 | West | 18—14 V |

ROBERT D. BALDWIN, Primary Examiner

M. O. SUTTON, Assistant Examiner

U.S. Cl. X.R.

264—209